United States Patent

[11] 3,580,984

| [72] | Inventor | Knut Arnold Oscar Gladh |
| | | Södertälje, Sweden |
| [21] | Appl. No. | 783,314 |
| [22] | Filed | Dec. 12, 1968 |
| [45] | Patented | May 25, 1971 |
| [73] | Assignee | Gladol S.A. |
| | | Geneva, Sweden |
| [32] | Priority | Dec. 13, 1967 |
| [33] | | Sweden |
| [31] | | 17,105/67 |

[54] SURFACE WIRING SYSTEMS
3 Claims, 26 Drawing Figs.

[52] U.S. Cl. ................................................ 174/48, 174/70
[51] Int. Cl. ............................................. H02g 3/04
[50] Field of Search ................................. 174/48, 49, 95, 96, 97, 68 C, 70.3, 72 C, 101; 339/22, 23, 24

[56] References Cited

UNITED STATES PATENTS

| 2,441,698 | 5/1948 | Gerspacher et al. | 339/23 |
| 2,611,800 | 9/1952 | Naughton | 339/22 |
| 3,029,303 | 4/1962 | Severino | 174/97 |
| 3,171,702 | 3/1965 | Schumacher et al. | 339/22 |

FOREIGN PATENTS

| 828,253 | 2/1960 | Great Britain | 174/49 |
| 1,168,818 | 9/1958 | France | 174/48 |
| 1,344,398 | 10/1963 | France | 339/22 |

*Primary Examiner*—Lewis H. Myers
*Assistant Examiner*—D.A. Tone
*Attorneys*—Ralph E. Bucknam, Jesse D. Reingold, Robert R. Strack and Henry A. Marzullo, Jr.

ABSTRACT: A prefabricated system for electrical installations in buildings, apartments and the like, wherein at least six aluminum conductors are embedded in a core, said core is covered by a cover means in the form of a conventional floor or ceiling molding or a conventional doorcase and jointed at at least each corner and outlet of the installation, and wherein the material of the core is of substantially uniform thickness around the aluminum conductors embedded in the core.

Patented May 25, 1971 3,580,984
8 Sheets-Sheet 1
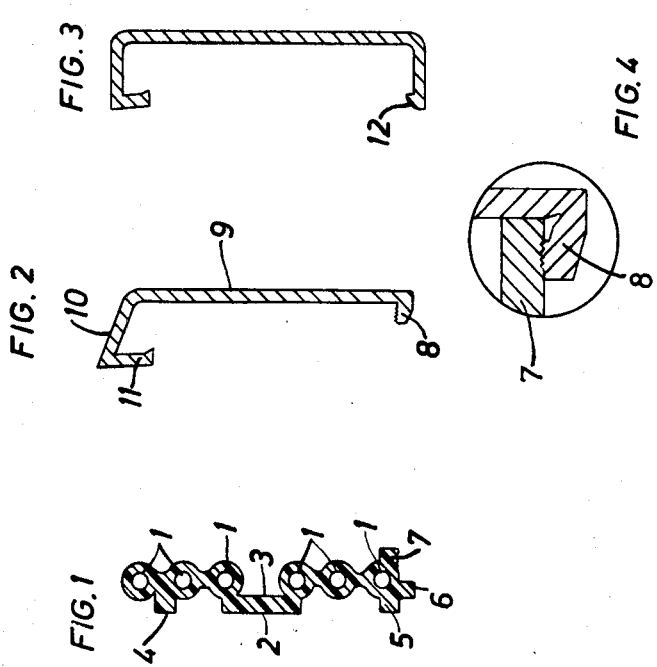

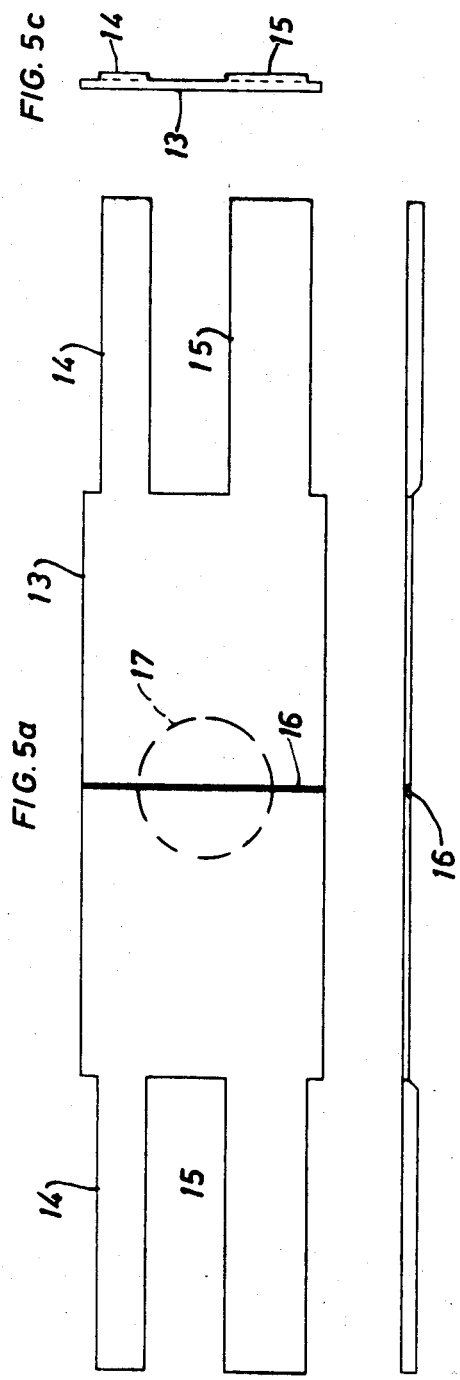

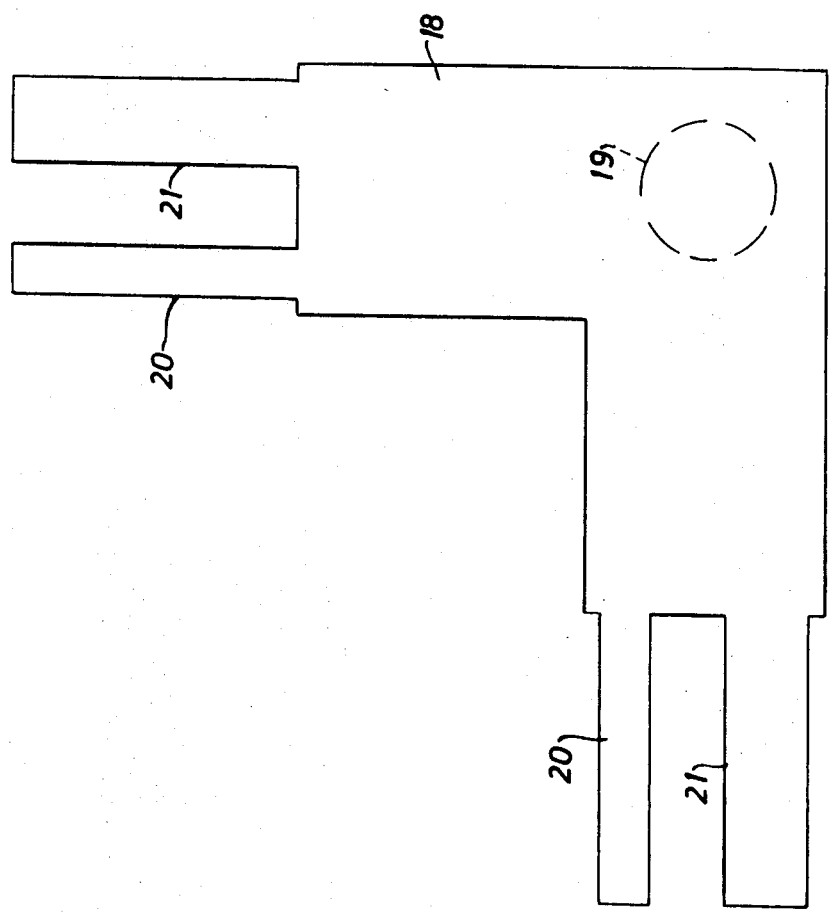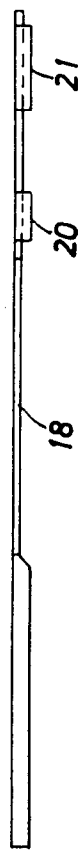

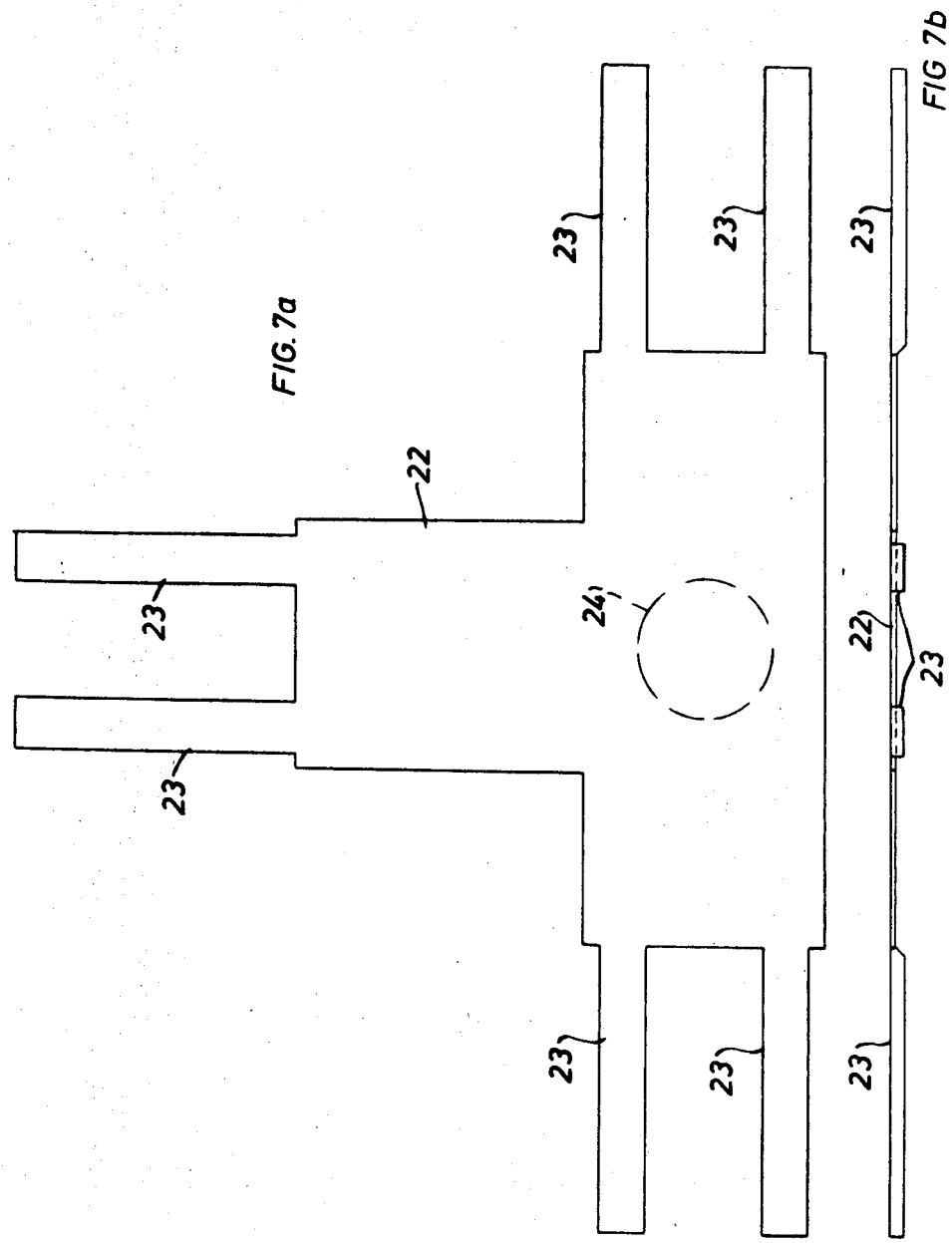

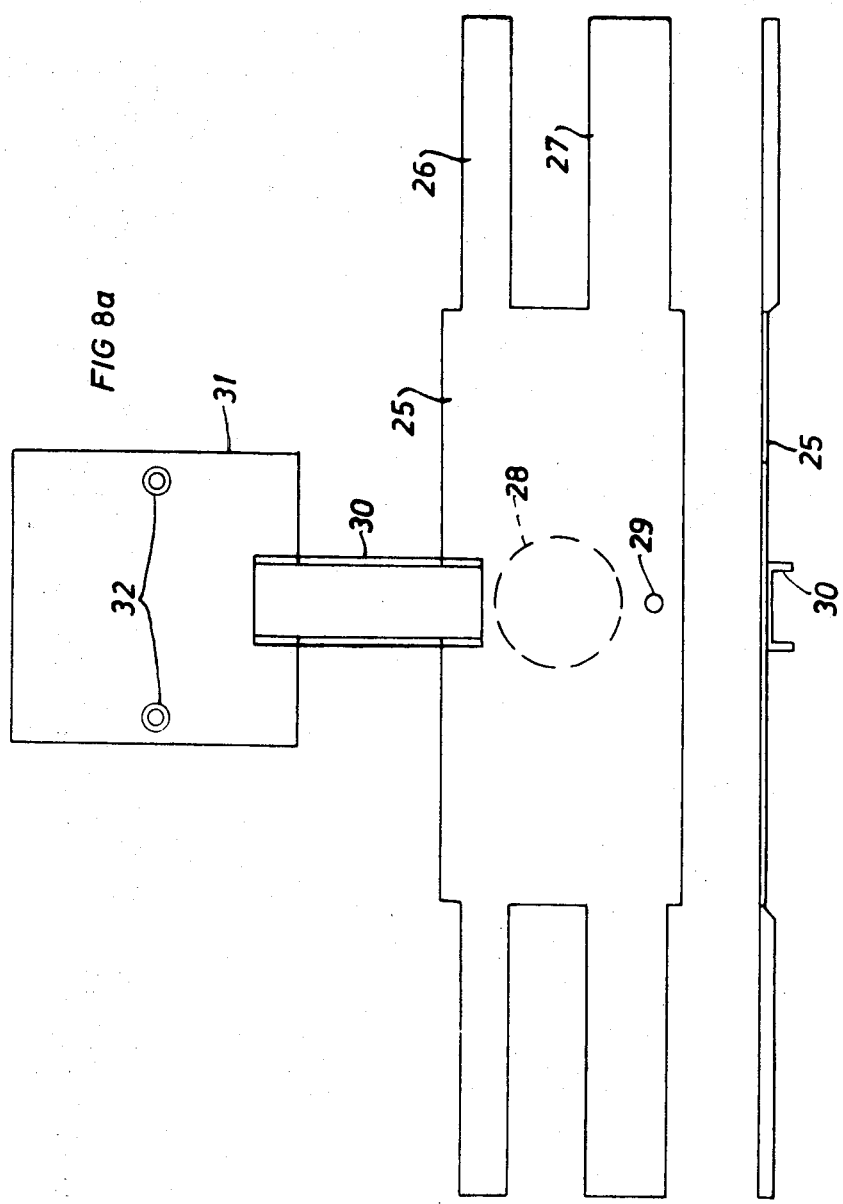

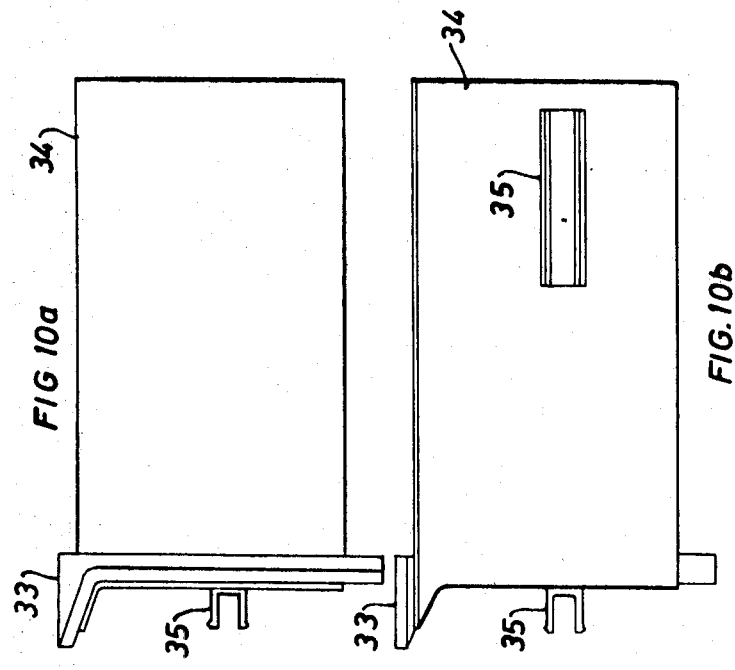
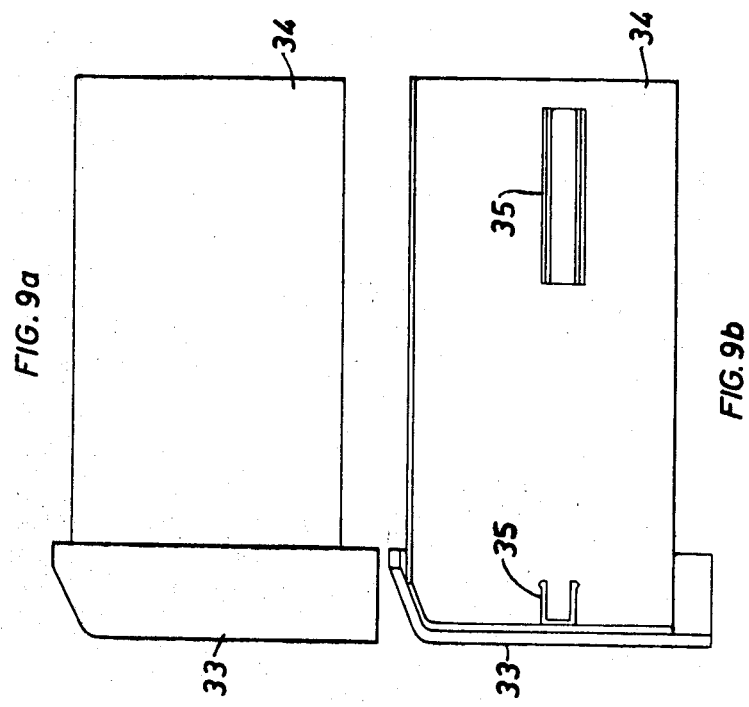

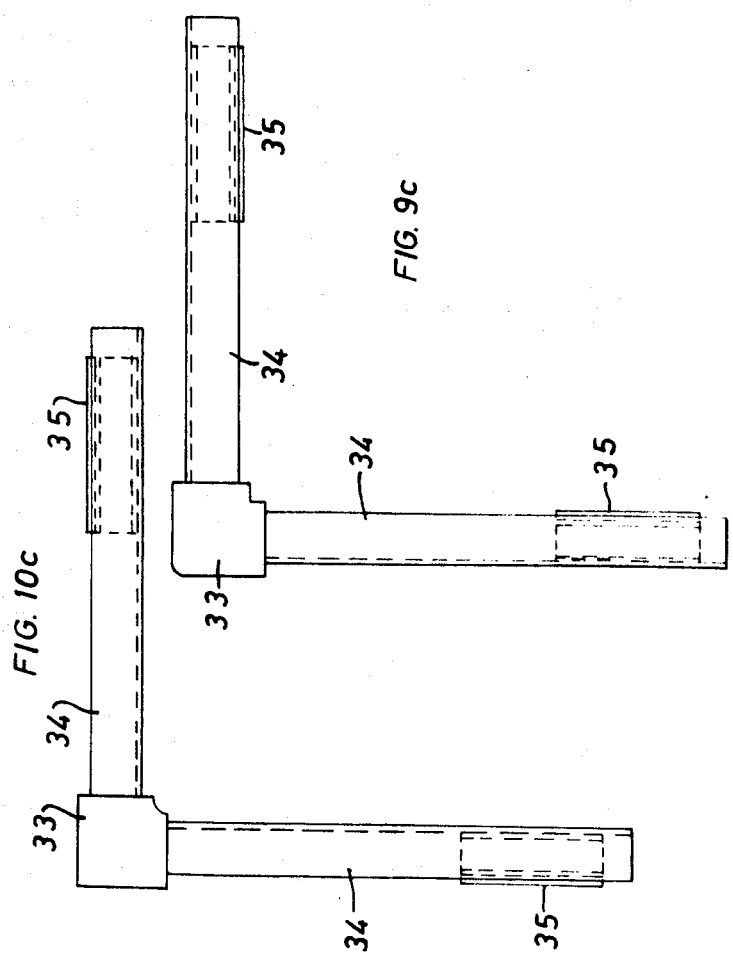

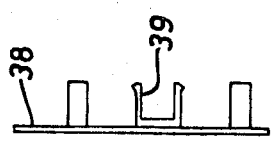
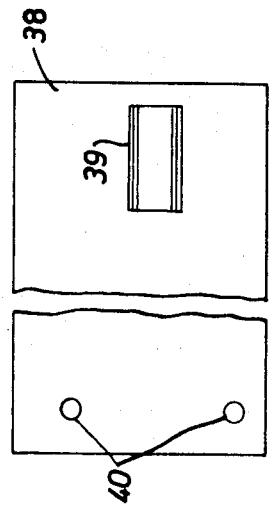
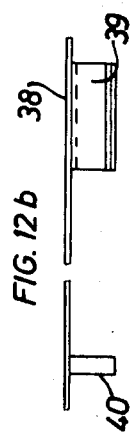
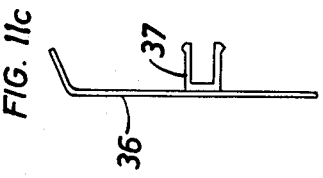
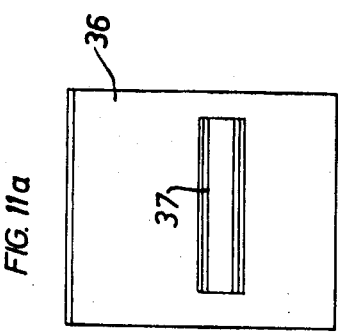
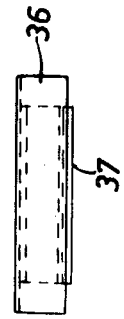

3,580,984

SURFACE WIRING SYSTEMS

This invention relates to a surface wiring system for electrical installations preferably in buildings, apartments and the like.

Although many surface wiring systems have heretofore been suggested none of them offers so great advantages over the traditional electrical wiring systems as to be really competitive with these in point of installation costs. The need for a practically useful surface wiring system becomes ever greater, particularly in view of the rapid development of building techniques and building elements.

In the hitherto known surface wiring systems use is made, as a rule, of conventional wires which are run for example in a hollow molding of synthetic plastics which is provided with different types of supporting surfaces on which the wires are placed. These systems are only applicable to certain extent but warrant considerably higher costs than the traditional installation technique.

The disadvantages and drawbacks of the hitherto known surface wiring systems are overcome by the present invention. The characteristic features of the surface wiring system according to the present invention reside in that at least six aluminum conductors are embedded in a core; that the core is mounted along at least those floor, ceiling and door portions where different types of apparatus shall be disposed, and is closed by means of a cover in the form of a conventional floor or ceiling molding or a conventional doorcase, said cover also extending along the floor, ceiling and door portions which do not have any apparatus; that the core is connected to another core piece at at least each corner and outlet of the installation; that in each joint between core pieces the exposed conductor ends are provided with suitable contact means for connection of conventional flexible conductors; and that at least behind each conductor connecting point is provided a first protective element preventing the flexible conductors from touching the base on which the core is mounted.

For better elucidation, the invention will now be more fully described in the following with reference to the accompanying drawings in which:

FIG. 1 is a cross section of a core according to the invention;

FIG. 2 is a cross section of a cover for the core in FIG. 1;

FIG. 3 is a view of another embodiment of the cover for the core in FIG. 1;

FIG. 4 is a view on a larger scale of part of the cover in FIG. 2 and part of the core in FIG. 1 in their assembled position;

FIG. 5a is a plan view of a core joint protective element;

FIG. 5b is a view of the protective element in FIG. 5a as seen from above;

FIG. 5c is a side view thereof;

FIG. 6a is a plan view of another core joint protective element;

FIG. 6b is a view of the protective element in FIG. 6a as seen from above;

FIG. 7a is a plan view of a further core joint protective element;

FIG. 7b is a view of the protective element in FIG. 7a as seen from above;

FIG. 8a is a plan view of still another core joint protective element;

FIG. 8b is a view of the protective element in FIG. 8a as seen from above;

FIG. 8c is a side view thereof;

FIG. 9a is a side view of a corner member having an outer core joint protective element for a cover;

FIG. 9b is a view of the corner member having the protective element as seen from the inside;

FIG. 9c is a view of the corner member having the protective element as seen from above;

FIG. 10a is a view of another corner member having a core joint protective element as seen from the outside:

FIG. 10b is a view of the corner member having the protective element as seen from the inside;

FIG. 10c is a view of the corner member having the protective element as seen from above;

FIG. 11a is a view of a cover joint protective element as seen from the inside;

FIG. 11b is a view of the protective element in FIG. 11a as seen from above;

FIG. 11c is a side view thereof;

FIG. 12a is a plan view of a cover joint protective element;

FIG. 12b is a view of the protective element in FIG. 12a as seen from above;

FIG. 12c is a side view thereof.

The core of the surface wiring system shown in FIG. 1 is preferably made by extrusion, and at least six aluminum conductors 1 are embedded in the core in the course of the extrusion. These aluminum conductors are mutually spaced apart and placed in two groups having three conductors in each group. The groups are mutually spaced apart and interconnected by means of a projection 2 provided on the rear face of the core. A space 3 of suitable shape is thus formed between the conductor groups in order to serve as a complement for suitable snap means. Provision of the space 3 is greatly facilitated by the material in the core being of substantially uniform thickness around the conductors. Arranged on the rear face of the core between the two uppermost conductors in the upper conductor group is a second projection 4 which will thus be situated a certain distance from the first projection 2. A third projection 5 also spaced from the first projection 2 is arranged on the rear face of the core at the lowermost conductor in the lower conductor group. The projections 2, 4 and 5 are essentially of the same height and intended to support the core from the base on which the core is to be mounted.

Mounting of the core on the base can be realized in many different ways. For example, the projection 2 may have holes extending from the space 3, said holes being intended for screws, nails or like members. The face of the projection 2 engaging the base may also be provided with a suitable adhesive. Of course, this adhesive can also be placed on the face of the projections 4 and 5 turned towards the base.

A further projection 6 in the form of a foot for the core extends from the underside of the core. Obviously, this foot may also be used as a snap hook with the cover shown in FIG. 3. Substantially opposite the projection 5 a still further projection 7 is disposed on the front face of the core. This further projection 7 is illustrated more in detail in FIG. 4 and serves as a snap hook for the cover shown in FIG. 2. For better locking action of the snap means a plurality of teeth are provided at the lower side of the projection 7 to engage with corresponding teeth arranged on a snap means portion of the cover in FIG. 2.

FIGS. 2 and 3 show in cross section a pair of different embodiments for a cover suitable for the core. The cover in FIG. 2 has a foot member 8 which is to cooperate with the projection 7 for snap-on engagement of the cover with the core. The vertical wall 9 of the cover is substantially uniform and the cover has an upper wall 10 which may be oblique to the base or horizontal and may terminate in a snap means portion 11 which is slightly oblique from the base to the vertical wall 9 and is in the form of a hook at the lower end to fit in a practically natural snap means engaging space between the projection 4 of the core and the uppermost conductor. The cover in FIG. 3 is substantially of the same shape as that in FIG. 2 except that the lower part is formed with a snap hook 12 which is to engage behind the projection 6 of the core.

The material of the core of course is some suitable insulating material, for example any suitable plastic. Likewise the cover may be made of any suitable plastic.

In FIGS. 5a—5c is shown a core joint protective element comprising an elongated plate 13 which is to be mounted behind the joint between two core pieces. Mounting of the plate 13 is effected by inserting the arms 14 and 15 that project from the plate ends into the spaces between the projections 2, 4 and 2, 5, respectively. Provided in the plate 13 are a crease line 16 and a knockout 17. The arms 14 have the same width and are slightly thicker than the plate 13 itself for adaptation to the depth of the space between the projections of the core. Further, the arms 15 have the same width and the same thickness as the arms 14. The length of the arms 14 and 15 is selected so that a suitable tolerance range and also stability is attained since the intention is to secure the plate merely by way of the arms 14, 15. The knockout 17 is for taking up a hole for example for a lead-in thereby interconnecting the wiring system of one room to another wiring system or a current supply system. The crease line 16 serves to facilitate bending the plate 13 around or in a corner. The plate 13 will thus constitute a protective element in each joint between two core pieces and as a consequence protect the interconnecting conductors from contacting the base on which the core is mounted.

The core is intended to be connected to another core piece at each corner and at each outlet point of the surface wiring system.

In FIGS. 6a and 6b is shown a protective element for a coplanar angle joint for instance between a floor molding and a doorcase or between a ceiling molding and a molding connected to the doorcase. The plate 18 is constructed in substantially the same way as the plate 13 but has no crease line 16. Further, the plate 18 largely is of V-shape, the limbs of the plate making a 90° angle between them, and the knockout 19 is situated substantially at the bottom of the V. From the two short ends of the plate 18 extend arms 20, 21 of the same configuration as the arms 14, 15 of the plate 13.

In FIGS. 7a and 7b is shown a further core joint protective element with a substantially T-shaped plate 22 which at each short end has two arms 23 which differ, however, from the arms of the earlier plates 13 and 18 in such a way that both arms 23 at each short end have the same width and thickness since the two arms should fit in the space between the projections 2 and 4 of the core. This will make it possible to use the same T-shaped plate or protective element for instance on both sides of a door. The plate 22 has no crease line but on the other hand a knockout 24 for instance for providing a passage for conductors through a wall or the like.

In FIGS. 8a—8c is shown a core joint protective element intended for a joint between two core pieces, where an outlet is to be provided.

The plate 25 with its arms 26, 27 is practically identical with the plate 13 with its arms 14 and 15 illustrated in FIGS. 5a—5c. The plate 25, however, has no crease line but on the other hand has a knockout 28 as well as a hole 29 for steady fixation, if desired, of the plate 25 to a base for example by means of a screw or like member. Extending in an upward direction from the upper side of the plate 25 is a channel member 30 substantially of U-shaped configuration, and on the end thereof facing away from the plate 25 is mounted a further plate 31 which carries two screw bushings 32. The plate 31 and the screw bushings 32 are provided for the mounting of an apparatus to be connected to the conductors 1 in the core. This apparatus may be a wall outlet, a switch, a ceiling outlet or the like. The flexible interconnecting conductors should be run from the conductors of the core via the channel member 30 to the apparatus mounted on the plate 31. It should be noted that the casing of the apparatus shall be of such a shape as to conform to the shape of the cover (shown in FIG. 2 or 3) for the surface wiring system.

At each joint and thus at each corner and outlet point the conductor ends in the core are exposed and equipped with suitable preferably insulated contact means or elements (not shown) for the connection of conventional flexible insulated connecting conductors leading to the conductors in the core. At the conductor ends to which an apparatus is to be connected are mounted double contact means or elements or such contact means or elements as house more than one connecting conductor. It should also be noted that the conductors embedded in the core serve as e.g. three phase conductors and earth, zero conductors and connecting wires. Preferably the three conductors in the uppermost group may be the phase conductors and the three conductors in the lowermost group the other conductors.

Upon covering the mounted core pieces and the various core joint protective elements it must be seen that the flexible connecting conductors and contact means or elements inside the joint cannot possibly be touched from a joint in the cover. The cover for the core pieces is connected like said core pieces to another cover length at least at each corner of the surface wiring system. There are thus required for the cover at least two different types of corner members, viz a corner member for an outside corner and a corner member for an inside corner. These corner members are shown in FIGS. 9a—9c and FIGS. 10a—10c.

The corner member 33 proper in FIGS. 9a—9c is of conventional corner construction for connection to the cover shown in FIG. 2. Secured to the corner member is a protective element 34 which shall extend inside the cover and shall cover the joint between two core pieces situated on either side of the corner. The corner member 33 is secured to the protective element 34, and fastening means 35 at each end is disposed on the inner side of the protective element which extends on either side of the corner. The fastening means 35 is in the form of a double snap means which is adapted to snap into the space 3 formed between the conductor groups in the core. This snap fastening of the corner member to the protective element 34 is sufficient for a secure mounting thereof to the core. No other fastening means are thus required. In exceptionally difficult cases a hole may be provided in the protective element 34 and the means 33 and 34 may be secured to the base through the space 3 in the core pieces.

The corner member structure illustrated in FIGS. 10a—10c is intended for an inside corner and is exactly of the same design as that shown in FIGS. 9a—9c. For this reason the parts carry the same reference numerals as in FIGS. 9a—9c.

Whenever it is necessary to connect two cover lengths together at points other than joints between core pieces a protective element of the type illustrated in FIGS. 11a—11c is mounted inside the joint between the cover lengths. Said protective member comprises a protective plate 36 having on the inner side thereof snap means 37. This is of the same configuration as the snap means 35 provided on the corner protective elements 34 and thus constitute a reliable snap device in conjunction with the space 3 in the core.

Whenever the T-shaped protective plate 22 is utilized in a joint protective element (FIGS. 12a—12c) must be employed to protect the joint formed in the cover. Said protective element is in the shape of a plate 38 which at one end carries a snap means 39 which is to form snap device in conjunction with the space 3 in the core. At the other end of the plate 38 two supporting studs 40 are provided to engage the plate 22 so that the said end of the plate 38 is supported, for which reason this plate cannot be bent down towards the plate 22. This will prevent the possibility of contacting the flexible conductors in the joint with tools or like members which are inserted in the joint between the cover lengths.

Obviously, all details of the surface wiring system can be made of one and the same plastic, but if desired for instance the core may be made of a plastic of higher quality to guarantee better insulating properties than the plastic of the other details.

It should be mentioned that the embodiment of the cover illustrated in FIG. 3 is suitably employed as a substitute for doorcases.

Apart from the apparent advantages of the surface wiring system herein described the system also provides the advantage that the entire electrical installation for an apartment can be made in a factory and delivered in packages to the building site or, wherever prefabricated houses are concerned, either to the site where they are erected or to the factory. The surface wiring system further provides the advantage that it can be mounted or placed without the aid of any tools whatever. As a rule, however, a conventional screwdriver is required.

In an apartment, for example, it is not necessary to run the cores along all walls, doorcases and ceilings, and at the places where no core is required one can employ the portion of the core which is peeled off for exposure of the conductor ends as a base for the cover. At these points the cover may of course be mounted also in other ways.

Modifications are possible within the scope of the appended claims.

What I claim and desire to secure by Letters Patent is:

1. A surface wiring system for electrical installations in buildings and the like, comprising an elongated core means in which a plurality of elongated conductors are embedded, said core means being adapted to be mounted along a building support surface, cover means supported on said core means, juncture means between said core means at which exposed ends of said conductors are connected by flexible conductors, said juncture means comprising a protective element preventing said flexible conductors from contacting said building support surface, said core means having integral spaced projections extending from one side of the core means and adapted to contact said building support surface and thereby space the main portion of said core means from said building support surface, said protective element having elongated arms, said spaced projections on said core means being constructed and arranged to receive said elongated arms on said protective element thereby to detachable secure the longitudinal ends of said core means to said protective element, said core means mounting two groups of elongated conductors positioned one above the other, and integral snap means on said core means generally disposed between said groups of conductors and adapted to cooperate with said cover means to facilitate securing the latter in place.

2. A surface wiring system for electrical installations in building and the like, comprising an elongated core means in which a plurality of elongated conductors are embedded, said core means being adapted to be mounted along a building support surface, cover means supported on said core means, juncture means between said core means at which exposed ends of said conductors are connected by flexible conductors, said juncture means comprising a protective element preventing said flexible conductors from contacting said building support surface, said protective element having knockouts and crease lines for folding said protective element around corners, said core means having integral spaced projections extending from one side of the core means and adapted to contact said building support surface and thereby space the main portion of said core means from said building support surface, said core means mounting two groups of elongated conductors positioned one above the other, and integral snap means on said core means generally centrally disposed between said groups of conductors and adapted to cooperate with said cover means to facilitate securing the latter in place.

3. A surface wiring system for electrical installations in building and the like, comprising an elongated core means in which a plurality of elongated conductors are embedded, said core means being adapted to be mounted along a building support surface, cover means supported on said core means, juncture means between said core means at which exposed ends of said conductors are connected by flexible conductors, said juncture means comprising a protective element preventing said flexible conductors from contacting said building support surface, a plate for mounting electrical equipment, and a channel member of substantially U-shaped configuration extending between said protective element and the plate to serve as a protection for connecting conductors, said core means having integral spaced projections extending from one side of the core means and adapted to contact said building support surface and thereby space the main portion of said core means from said building support surface, said core means mounting two groups of elongated conductors positioned one above the other, and integral snap means on said core means generally centrally disposed between said groups of conductors and adapted to cooperate with said cover means to facilitate securing the latter in place.